United States Patent
Yoo et al.

(10) Patent No.: US 9,962,918 B2
(45) Date of Patent: May 8, 2018

(54) PRODUCTION METHOD FOR A SUPPORT TYPE COATING MEMBRANE USING TAPE CASTING

(71) Applicant: Korea Electric Power Corporation, Seoul (KR)

(72) Inventors: Young-Sung Yoo, Daejeon (KR); Mi-Hwa Choi, Daejeon (KR); Tae-Hee Lee, Daejeon (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 118 days.

(21) Appl. No.: 14/345,880

(22) PCT Filed: Sep. 20, 2012

(86) PCT No.: PCT/KR2012/007544
§ 371 (c)(1),
(2) Date: Mar. 19, 2014

(87) PCT Pub. No.: WO2013/042958
PCT Pub. Date: Mar. 28, 2013

(65) Prior Publication Data
US 2014/0227613 A1    Aug. 14, 2014

(30) Foreign Application Priority Data

Sep. 21, 2011 (KR) .................. 10-2011-0095053

(51) Int. Cl.
*H01M 4/86* (2006.01)
*H01M 4/88* (2006.01)
(Continued)

(52) U.S. Cl.
CPC .............. *B32B 37/24* (2013.01); *B32B 18/00* (2013.01); *C25B 9/00* (2013.01); *C25B 9/10* (2013.01);
(Continued)

(58) Field of Classification Search
CPC ............. H01M 8/0291; H01M 8/0247; H01M 4/8657; H01M 4/8803; H01M 4/8857;
(Continued)

(56) References Cited

U.S. PATENT DOCUMENTS 5,935,727 A * 8/1999 Chiao ................. H01M 8/2435
429/465
2003/0129460 A1    7/2003 Donelson et al.
(Continued)

FOREIGN PATENT DOCUMENTS

CN    101242003 A    8/2008
DE    19811708 A1    9/1999
(Continued)

OTHER PUBLICATIONS

International Search Report, w/ English translation thereof, issued in International Application No. PCT/KR2012/007544 dated Feb. 22, 2013.
(Continued)

*Primary Examiner* — Kenneth J Douyette
(74) *Attorney, Agent, or Firm* — McDermott Will & Emery LLP (57) ABSTRACT

The present invention relates to a production method for a support type ceramic membrane using tape casting, wherein, when producing a multifunctional membrane comprising a membrane structure such as a general electrochemical device or electrolysis cell or fuel cell, a dense-structure coating membrane or porous functional (separation) membrane is produced on one or more surfaces of a porous support.

15 Claims, 5 Drawing Sheets

(51) Int. Cl.
| | |
|---|---|
| H01M 8/02 | (2016.01) |
| H01M 8/00 | (2016.01) |
| B32B 37/24 | (2006.01) |
| B32B 18/00 | (2006.01) |
| H01M 8/124 | (2016.01) |
| C25B 9/00 | (2006.01) |
| C25B 11/02 | (2006.01) |
| C25B 13/02 | (2006.01) |
| H01M 8/0247 | (2016.01) |
| C25B 9/10 | (2006.01) |
| H01M 8/1226 | (2016.01) |

(52) U.S. Cl.
CPC ............ *C25B 11/02* (2013.01); *C25B 13/02* (2013.01); *H01M 4/8657* (2013.01); *H01M 4/8803* (2013.01); *H01M 4/8857* (2013.01); *H01M 4/8875* (2013.01); *H01M 8/0247* (2013.01); *H01M 8/124* (2013.01); *C04B 2235/6025* (2013.01); *C04B 2235/768* (2013.01); *C04B 2237/066* (2013.01); *C04B 2237/068* (2013.01); *C04B 2237/34* (2013.01); *C04B 2237/341* (2013.01); *C04B 2237/345* (2013.01); *C04B 2237/348* (2013.01); *C04B 2237/365* (2013.01); *C04B 2237/368* (2013.01); *C04B 2237/765* (2013.01); *H01M 4/8889* (2013.01); *H01M 8/1226* (2013.01); *H01M 2008/1293* (2013.01); *Y02P 70/56* (2015.11)

(58) Field of Classification Search
CPC ........... C25B 11/02; C25B 13/02; C25B 9/00; B23B 37/24
See application file for complete search history.

(56) References Cited

U.S. PATENT DOCUMENTS

| | | | |
|---|---|---|---|
| 2004/0112504 A1* | 6/2004 | Roosen | ................... B32B 18/00 156/89.16 |
| 2004/0265664 A1* | 12/2004 | Badding | ............... C04B 35/486 429/446 |
| 2005/0095482 A1* | 5/2005 | Garner | .................. C04B 35/486 429/482 |
| 2005/0095483 A1* | 5/2005 | Song | ..................... C04B 35/016 429/466 |
| 2007/0059574 A1 | 3/2007 | Kim et al. | |
| 2008/0124602 A1 | 5/2008 | Larsen et al. | |

FOREIGN PATENT DOCUMENTS

| | | |
|---|---|---|
| JP | 2009-208236 A | 9/2009 |
| KR | 10-0194615 B1 | 2/1999 |
| KR | 10-2006-0104822 A | 10/2006 |
| KR | 10-2010-0134347 A | 12/2010 |

OTHER PUBLICATIONS

Office Action issued in corresponding German Patent Application No. 11 2012 003 921.1, dated Jun. 1, 2016; with English translation.

* cited by examiner (PRIOR ART)
FIG. 1

ANODE: NiO : YSZ = 5 : 5
ELECTROLYTE: 8YSZ
 (8MOL% $Y_2O_3$ STABILIZED $ZrO_2$)
CATHODE: LSCF

PRODUCTION METHOD FOR A SUPPORT TYPE COATING MEMBRANE USING TAPE CASTING

This application is the U.S. National Phase under 35 U.S.C. § 371 of International Application No. PCT/KR2012/007544, filed on Sep. 20, 2012, which claims the benefit of Korean Patent Application No. 10-2011-0095053, filed on Sep. 21, 2011, which are hereby incorporated by reference in their entirety into this application.

TECHNICAL FIELD

The present invention relates to a method of manufacturing a support-type ceramic membrane (thin film). This method can be used in manufacturing an electrochemical device (electrolysis cell or fuel cell) or a separation membrane.

BACKGROUND ART

As methods of forming a dense-structure coating film (several micrometers or several tens of micrometers ($\mu m$)) on the surface of a support, there are gas-phase methods and liquid-phase methods. Examples of gas-phase methods may include electrochemical vapor deposition (EVD), chemical vapor deposition (CVD), sputtering, ion beam method, electron beam method, and the like. However, each of the gas-phase methods has at least one disadvantage, such as requirement of expensive manufacturing equipment, starting material restrictions, difficulty in fabricating a thick specimen attributable to low thin film growth rate, insufficient adhesion between a coating film and a substrate, stripping of a coating film due to residual stress, limitation in size of a specimen, and the like. For this reason, liquid-phase methods, which are relatively easily carried out compared to gas-phase methods, are frequently used. Particularly, examples of liquid-phase methods may include sol-gel process, slip coating, slurry coating, spin coating, dipping, electrochemical process, electrophoresis, hydrothermal synthesis, and the like. Among these liquid-phase methods, in the dipping, spin coating, slurry coating including spray coating or sol-gel process, a coating layer is dried or gelled in the early stage because of its low green density, and simultaneously, is greatly contracted. The contraction of a coating layer causes a stress between a support and a coating layer, and this stress becomes more severe in the subsequent sintering process, thereby causing cracking of the coating layer and stripping of the coating layer from the support. As mentioned in the paper (K. Murata and M. Shimotsu, Denki Kagaku, V. 65, No 1, 1997), it is known in this paper that the thickness of a coating layer applied at one time must be adjusted to 1 $\mu m$ or less in order to prevent the cracking of the coating layer and the stripping of the coating layer from the support. That is, there is a disadvantage in that drying and heat treatment processes must be repeated at least ten times in order to obtain a dense-structure coating layer having a thickness of 10 $\mu m$ using this method. Further, as mentioned in the paper (T. Ishihara, J. Am. Ceram. Soc., Vol. 79, No. 4, pp 913-19, 1996), the method mentioned in this paper is also disadvantageous in that, in the selection of a substrate in the electrochemical deposition, electrophoresis or hydrothermal synthesis, raw materials having high electrical conductivity must be used.

Here, a dense-structure film is referred to as a film adhered strongly to a support to a sintered density of 30% or more. When the sintered density of such a dense-structure (gas-impermeable (or gas tight) or porous functional) film is 90% or more, it is known that gas scarcely transmits the film. Only this dense-structure film is used in a general electrochemical device or a mechanical or electrical device having functionality.

However, a method of forming a dense-structure film using a semiconductor process, such as CVD, EVD or the like, is known to be unsuitable for manufacturing a large-area support-type coating film, because expensive manufacturing equipment is used, and a lot of processing time is required, thus increasing a total manufacturing cost. Therefore, there has generally been used a method of manufacturing a support-type coating film, including the steps of: dispersing ceramic powder particles in a solution containing an organic binder in a solvent to form a slurry; directly coating a support (ceramic support or metal support) with the slurry using dip coating, spin coating or spray coating; and co-sintering the support coated with the slurry. However, this method is disadvantageous in that only one side of the support is coated, and it is difficult to maintain the uniform thickness and reproducibility of the coating film according to the manufacturing conditions.

Particularly, in the case of a fuel cell, when an electrolyte sheet directly adheres to a support, the green (dried) electrolyte sheet is torn in the step of adhering, or the contraction rate thereof cannot be easily controlled due to the adhesion between the electrolyte to the support during co-sintering, so a dense-structure electrolyte membrane cannot be obtained, and thus it is difficult to manufacture a single cell. Therefore, conventionally, as in a multilayer dielectric chip (MLDC) method, calendar method or conventional patent (manufacture of an anode support-type single cell), there has been used a method of manufacturing a single cell by laminating electrolyte and anode sheets to form a sheet cell and then applying a slurry to the sheet cell. However, this method is also problematic in that, in the process of manufacturing a single cell, the sheet cell must be prepared by separately fabricating the electrolyte sheet and the anode sheet every time and then respectively adhering these sheets to a support, and these sheets adhere to the support using a slurry for adhering, thus causing the non-uniformity of composition and thickness of the sheet cell, and in that the manufacturing cost thereof increases.

Further, a conventional multilayer sheet adhering method has been widely known as a method of manufacturing a multilayer dielectric chip (MLDC). However, this method is problematic in that a large number of tape-cast sheets are required to manufacture a single cell, so the production yield thereof rapidly decreases, thereby increasing the production cost thereof.

Hitherto, in the field of solid oxide electrolysis cells or fuel cells, as proposed in the paper (N. Q. Minh, J. Am. Ceram. Soc., Vol. 76, No. 3, pp 563-88, 1993), it is known that a tape casting method or doctor blade method is widely used in manufacturing a thin plate having a thickness of several micrometers ($\mu m$) or several tens of micrometers ($\mu m$), but is difficult to manufacture a multilayer specimen including a support and a coating layer made of different materials. In this case, a dense-structure coating film cannot be formed by only a single-component green electrolyte sheet. Therefore, there has been known a method of manufacturing a single cell by adhering (attaching) a cathode green sheet, an electrolyte green sheet and an anode green sheet to form a multi-composite layer and then heat-treating the multi-composite layer or a method of manufacturing a single cell by adhering (attaching) an electrolyte green sheet and a cathode green sheet or an electrolyte green sheet and an anode green sheet to form a double composite layer and then attaching the double composite layer to a support or forming another constituent (anode or cathode). However, in this case, a process of preparing a composite green sheet by attaching several green sheets to each other must be performed. Therefore, this method is also problematic in that the manufacturing cost thereof increases, in that, when the single cell is manufactured by attaching large-area sheets to each other, these sheets are non-uniformly attached, and thus the defective fraction thereof increases, thus decreasing the production yield thereof, and in that, when the single cell is manufactured using roughly-surfaced sheets, the attaching of these sheets becomes difficult, thus rapidly increasing the manufacturing cost thereof.

According to a conventional tape casting method, an electrolyte layer is formed into a green sheet having a thickness of 100 to 200 μm, anode paste is printed on one side of the green sheet, dried and heat-treated to form an anode, and then cathode paste is printed on the other side of the green sheet, dried and heat-treated to form a cathode, thus manufacturing a single cell. In this case, since the electrolyte green sheet serves as a matrix, the manufactured single cell may be an electrolyte support-type single cell. However, this method is problematic in that, as the thickness of the electrolyte layer increases, the internal resistance thereof increases, so operation temperature must be high, and the output performance of the single cell deteriorates, and in that, since the single cell can be operated only when the thickness thereof is 300 μm or less, the strength thereof is relatively low, and thus this single cell is apt to break. Further, this method is also problematic in that it is difficult to manufacture a large-area single cell because the flatness of the electrolyte layer in sintering is poor.

Meanwhile, there has been a method of manufacturing a layered hard sintered body, wherein an electrolyte, an anode and a cathode are respectively prepared by tape casting, and their respective green sheets are formed into a two-layer laminate, that is, an electrolyte-anode laminate or an electrolyte-cathode laminate or are overlapped, pressed and adhered to each other to form an electrolyte-anode-cathode laminate, and then these laminates are simultaneously sintered, thereby obtaining the layered hard sintered body. Even in this case, in order for a single cell to have enough strength to be operated, several sheets of any one of an electrolyte, an anode and a cathode are overlapped and laminated. Here, when several anode sheets are overlapped and laminated, an anode support type SOFC (solid oxide fuel cell) is manufactured, and, when several cathode sheets are overlapped and laminated, a cathode support type single cell is manufactured. In this case, since the thickness of a sintered electrolyte sheet having high internal resistance can be easily adjusted to 5~50 μm, there is an advantage of manufacturing a low temperature operation type SOFC having lower resistance and generating high power. In this step, a multi-composite green sheet may prepared by a calendar rolling process including tape casting and attaching steps. In the calendar rolling process, even when any one previously tape-cast green sheet (for example, anode) is sequentially tape-cast thereon with other green sheets (for example, electrolyte and cathode), a multi-composite green sheet having the same effect can be manufactured. Finally, it is widely known that such a multi-composite green sheet is heat-treated (sintered) to obtain a sintered body, and this sintered body is screen-printed and dried to manufacture a SOFC. However, in this case, there are many problems in that a large number of green sheets for tape casting is required in manufacturing a single cell, thus decreasing the production yield thereof and increasing the production cost thereof, and in that a large amount of an organic binder is required for tape casting, so a heat treatment cost for removing the organic binder is needed, and environmental pollution, consumption of raw materials, and the like are caused.

DISCLOSURE

Technical Problem

Accordingly the present invention has been devised to solve the above-mentioned problems, and an object of the present invention is to provide a method of manufacturing a dense-structure support type coating film, wherein a green sheet, which is a precursor of a coating film constituting an electrolyte or ceramic separation membrane (the most important constituent of an electrochemical device), is prepared by a one-step tape casting process, and this green sheet is directly applied on a support, and thus a non-defective dense-structure coating film can be uniformly formed on the support.

Technical Solution

In order to accomplish the above object, an aspect of the present invention provides a method of manufacturing a support type coating membrane, including the steps of: forming a support; forming a green sheet for coating on a release film; attaching the green sheet onto the support to form a laminate including the release film, green sheet and support; removing the release film from the laminate to form a combination of the support and green sheet; and co-sintering the combination.

In the step of forming the green sheet, the support may be a pre-sintered porous support, and may be formed by molding and heat-treating binder-containing powder for support.

In the step of forming the green sheet, the green sheet may be formed by tape-casting a binder-containing ceramic slurry.

The method may further include the step of applying a solvent or oil onto the support or green sheet before the step of attaching the green sheet onto the support.

The method may further include the step of aging the combination of the support and green sheet after the step of removing the release film.

In the step of removing the release film, a pressurization-type or depressurization-type attaching apparatus may be used.

The coating membrane may have a thickness of 0.1 to 900 μm and a sintered density of 30% or more.

The thickness and composition of the coating membrane may be adjusted at the time of forming the green sheet, or may be adjusted by repeatedly attaching different green sheets to each other.

The support may be an anode or cathode. Further, the support may be a flat support, a tubular support or a hybrid support thereof.

The coating membrane may be an electrolyte layer or separation membrane.

Another aspect of the present invention provides a support type coating membrane manufactured by the method.

Still another aspect of the present invention provides a fuel cell, electrolysis cell or separation module including the support type coating membrane.

Advantageous Effects

The method of manufacturing a support type coating film using tape casting or pressurization or depressurization attaching according to the present invention is characterized in that a thin film having desired thickness can be simply and easily prepared compared to a conventional gas-phase or liquid-phase method, and, particularly, a non-defective homogeneous electrolyte or ceramic layer having a thickness of 1 to several hundreds of micrometers (μm) can be easily prepared when this method is used to manufacture a solid oxide fuel cell (SOFC). Therefore, this method can be widely in manufacturing composite electrolyte membranes each containing multi-component coating layer and other support type dense-structure membranes as well as manufacturing conventional flat, tubular or complicated shaped electrochemical devices (electrolysis cells and fuel cells) or functional structure materials (separation membrane, interconnector, etc.).

DESCRIPTION OF THE REFERENCE NUMERALS IN THE DRAWINGS

10: tape casting apparatus
11: sheet moving direction
13: conveyor sheet
15: green sheet
15a: release film (Mylar film)
17: slurry
19: doctor blade
21: drying oven
23: separator
25: cutter
31: support (porous)
40: depressurization type attaching apparatus
41: depressurization unit
43: valve
45: stay

BEST MODE

The present invention provides a method of manufacturing a support type coating membrane by a process including the steps of: preparing a slurry; tape-casting the slurry to form a sheet; drying the sheet; and attaching the dried sheet to a support.

The method of the present invention is characterized in that the yield of a material can be remarkably increased because it is not complicated compared to a conventional slurry coating method, and in that a dense-structure (gas-impermeable (or gas tight) or porous functional) ceramic film can be formed on the surface of a porous body because the dense-structure ceramic film and the porous body can be attached to each other and sintered at the same time although their compositions are different from each other.

Particularly, according to the present invention, the number of times of tape casting per single cell can be remarkably reduced, and, as in a fuel cell, a single cell can be manufactured by attaching an electrolyte sheet to the surface of a large-area support and simultaneously sintering them. In this case, since the sintering process is performed at a high temperature of about 1000° C. or more at which a solid oxide electrolyte can be sufficiently sintered, it can be used in forming an oxide or non-oxide ceramic layer having a thickness of several micrometers (μm) to several hundreds of micrometers (μm) on a porous electrode support. In particularly, such a support type ceramic layer can be widely used in manufacturing an electrolyte membrane or a ceramic separation membrane.

The method of manufacturing a support type coating membrane according to the present invention can be used in manufacturing high-performance solid oxide electrolysis cells (SOECs) capable of operating at low temperature, solid oxide fuel cells (SOFCs), direct carbon fuel cells (DCFCs) having a multi-functional membrane, ion transport membranes (ITMs) used in separating oxygen or hydrogen in an integrated gasification combined cycle (IGCC).

For example, in the field of SOFCs, electrode support type single cells include cathode support type single cells in each which a cathode is thicker than other layers, and anode support type single cells in each which an anode is relatively thick. Since such electrode support type single cells are thinner than electrolyte support type single cells, their internal resistance and polarization resistance at the same temperature are relatively low compared to those of electrolyte support type single cells, and thus they can exhibit high power, so they have been used and developed as low-temperature single cells. In order to form a thin electrolyte layer, a specific electrolyte coating method is used. Specifically, any one of cathode and anode supports is made relatively thick, and one side of the anode support or cathode support is provided with a dense-structure electrolyte thin film having a thickness of micrometers (μm) to several hundreds of micrometers (μm) using co-sintering or the like, and then a porous cathode (or anode) is formed on the surface of the electrolyte thin film using screen printing and heat treatment, thereby manufacturing an SOFC single cell.

Meanwhile, the ceramic film having a thickness of micrometers (μm) to several hundreds of micrometers (μm), fabricated by the method of the present invention, can be widely used in manufacturing electrolysis cells for producing oxygen or hydrogen, electrolyte membranes for fuel cells, separation membranes for separating gas, and the like. Particularly, when a sheet fabricated by conventional calendar rolling, contacting or tape casting (or doctor blading) is further tape-cast with other sheets to fabricate a multiple sheet laminate, the sheets can be directly attached with each other without performing middle procedures such as attachment using an adhesive, thermal pressing or the like.

In the case of an anode support type solid oxide fuel cell, when an anode support is directly attached with an electrolyte layer, the solid oxide fuel cell may have a structure in which the anode support is coated with an electrolyte. However, in this case, the loss of a raw material occurs during the procedure of directly attaching an electrolyte layer to an anode support, and the anode support and the electrolyte layer are not easily attached to each other because their compositions are different from each other. Therefore, a green sheet and a film must be separated and simultaneously attached to a support by applying suitable pressure thereto. In this case, the green sheet may be separated from the film, and simultaneously the green sheet may be attached to the support, using a pressurization apparatus or depressurization apparatus. Generally, in this case, since an electrolyte or a green sheet is not uniformly applied on to the entire surface of a support, there is a problem in that they are not easily attached or they are torn. Further, there is a problem in that, according to the characteristics of a solvent used in the attaching process, a green sheet locally reacts with a solvent to be dissolved or torn, or stress is concentrated to one place to allow the green sheet to be torn. Particularly, problems do not occur at the time of attachment of the green sheet and the support, but, when the green sheet and the support are simultaneously sintered, there is a problem in that the green sheet is cracked due to the contraction difference between the green sheet and the support and the volatility of the solvent, thus greatly deteriorating the quality and characteristics of a final support type dense-structure membrane. Therefore, a method of uniformly attaching a green sheet to the entire surface of a support is required. For this purpose, the present invention provides a method of uniformly attaching a green sheet to the surface of a support while externally pressurizing or depressurizing one side of the support with the support being fixed. In this method, a high-density electrolyte green sheet is attached to an anode support, thereby fabricating an electrolyte-coated body.

When slurry dispersed with coating composition particles is tape-cast and dried, a laminate composed of a green sheet and a release film (Mylar film) can be obtained, and, when the obtained laminate is attached to a support using the pressure difference between both ends of the support (anode) and the lower end of the support is depressurized, the release film can be easily separated from the green sheet with the green sheet being attached to the support. In this case, when a small amount of a solvent such as terpineol is applied to the surface of the green sheet, adhesive force and depressurization effect can be obtained, and thus the release film can be easily removed. Similarly, even when pressurization is used instead of depressurization, the same effect can be obtained, but the removal of the release film is not easy compared to when depressurization is used. That is, when pressurization or depressurization is used, the density of the green sheet can be maintained even after attachment, and thus a dense-structure sintered electrolyte layer can be obtained even after sintering. Further, in this case, since pressure is uniformly transferred even when coating a large-area specimen, the green sheet is not mechanically damaged, and simultaneously the solid density of the initial green sheet can be maintained high, thus preventing cracks or deformation occurring during heat treatment (sintering). Further, when the particle size and composition of raw materials and the sintering conditions, such as sintering time, sintering temperature and the like, are adjusted, a support type ceramic film having a desired pore size can be precisely manufactured.

Figure 7:
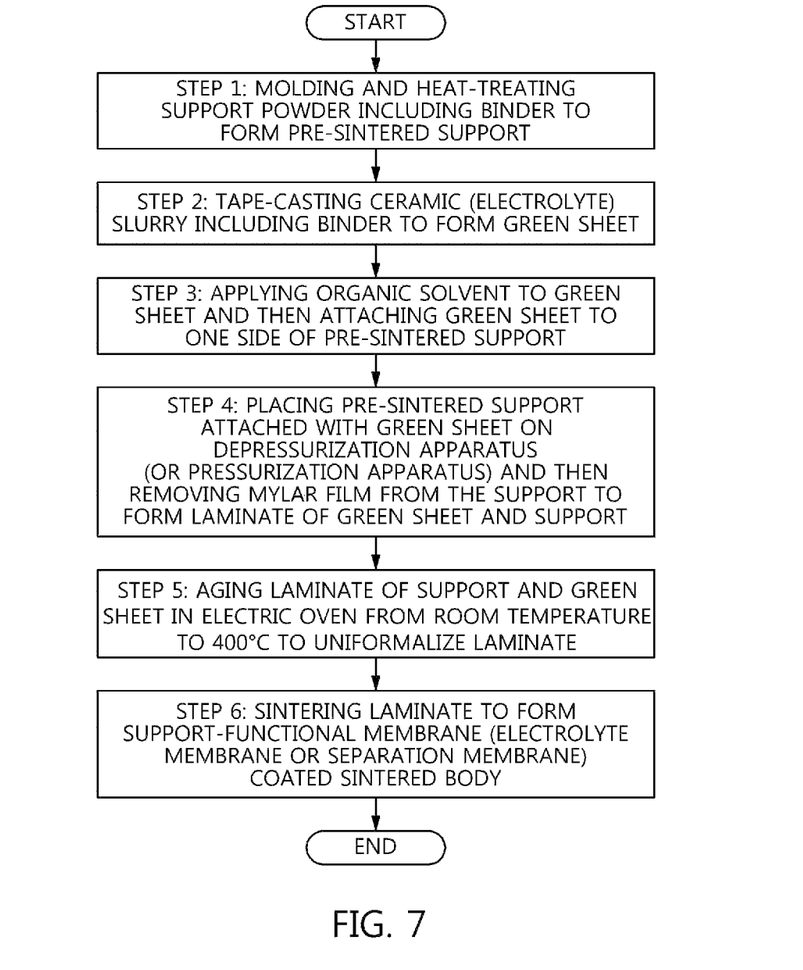
FIG. 7 is a flow diagram showing a process of manufacturing a support-type coating film according to the present invention.

As shown in FIG. 7, the method of manufacturing a support type coating membrane according to an embodiment of the present invention includes the steps of: 1) molding and heat-treating support (anode or cathode) powder including a binder to form a pre-sintered support; 2) tape-casting a ceramic (electrolyte) slurry including an organic binder to form an electrolyte green sheet; 3) applying an organic solvent to the electrolyte green sheet and then attaching this electrolyte green sheet to one side of the pre-sintered support; 4) placing the pre-sintered support attached with the electrolyte green sheet on a depressurization apparatus and then removing the Mylar film from the support to directly attach the green sheet to the support, thereby forming a laminate of the green sheet and the support; 5) aging the laminate of the support and the green sheet in an electric oven or the like from room temperature to 400° C. to uniformalize the laminate; and 6) sintering the laminate to form a support-functional membrane (electrolyte membrane or separation membrane) coated sintered body.

For example, in the case where the present invention is applied to an electrolysis cell or fuel cell for an electrochemical device, first, an electrode (anode or cathode) support is formed and heat-treated (pre-sintered). Then, an organic binder or the like is added to electrolyte powder to prepare slurry for tape casting, and then the slurry is formed into an electrolyte green sheet through a tape casting process. Then, this green sheet is directly attached to the surface of the pre-sintered anode (or cathode) support, and then the anode (or cathode) support attached with the green sheet is sintered (co-sintered) to form an anode (or cathode) support having a dense-structure electrolyte film. Finally, the upper surface of the electrolyte film is printed with a cathode (or anode) material paste, dried and heat-treated, thereby manufacturing a single cell having a three-layered structure including an anode/electrolyte/cathode.

In the present invention, the support type dense-structure film may be fabricated by preparing a green sheet using a tape casting apparatus and simultaneously attaching this green sheet to a support and then co-sintering the green sheet and the support.

In the present invention, a green sheet tape-cast using a depressurization apparatus is attached to a support, and then a release film, for example, a PET film is removed therefrom. Then, the green sheet is attached to the upper surface of the support, dried (aged) and heat-treated, thereby manufacturing a support type dense-structure sintered body.

In the present invention, slurry including an organic binder and oxide or non-oxide powder is formed into a dense-structure green sheet using a tape casting apparatus, and then this green sheet is attached to a porous support, dried or aged (stabilized) and finally co-sintered, thus forming a dense-structure coating film having uniform thickness. Here, defects do not exist between the support and the coating film.

In the present invention, in order to minimize the contraction of a coating layer during drying (or aging) and sintering, a pre-sintered porous support is formed, and then this pre-sintered porous support is attached with a green sheet and simultaneously heat-treated, thus forming a coating film having uniform thickness. Here, defects do not exist between the support and the coating film.

In the present invention, a tape-cast green sheet is attached to a green sheet under the condition of pressure difference caused by depressurization, and simultaneously a release film (Mylar film) is removed from the green sheet, thereby completely attaching the support and the green sheet.

In the present invention, when a tape-cast green sheet is attached to a green sheet under the condition of pressure difference caused by depressurization, in order to induce the uniform and strong adhesion between the support and the green sheet, a solvent or oil is applied to the upper surface of the tape-cast green sheet, and then this green sheet is attached to the support, thereby exhibiting uniform adhesion effects.

In the present invention, the thickness of the coating film after final sintering may be in a range of 0.1 μm to several hundreds of micrometers (μm), and the sintered density thereof may be 30% or more.

In the present invention, in order to adjust thickness and/or composition, slurry containing oxide or non-oxide powder is tape-cast to prepare a green sheet, and then this green sheet is attached to a support and primarily heat-treated, and then this procedure is repeated, thus sequentially forming a monolayer or multilayer coating film having desired thickness and/or composition. Further, the occurrence of defects is reduced, thus forming a high-quality coating film.

In the present invention, in the case of an anode support, an anode material such as NiO powder or the like; an electrolyte material such as zirconia ($ZrO_2$+xmol % Oxide), ceria ($CeO_2$+xmol % Oxide), bismuth oxide ($Bi_2O_3$+xmol % Oxide), barium-strontium cerate compound ($(Ba,Sr)CeO_3$+xmol % Oxide), lanthanum-strontium gallium-magnesia oxide ($(La,Sr)(GaMg)O_3$+xmol % Oxide) or the like; and a pore forming agent such as graphite powder are mixed, ball-milled, dried, molded and then primarily heat-treated at 600 to 1,500° C. for several hours, thereby forming a pre-sintered porous anode support. This pre-sintered porous anode support can be used as an anode support for solid oxide fuel cells or solid oxide electrolysis cells.

In the present invention, an electrolyte green sheet may be formed by tape-casting a slurry including an organic binder, a solvent (organic solvent or water-based solvent) and at least one electrolyte material selected from among zirconia, ceria, bismuth oxide, a barium-strontium cerate compound and a lanthanum-strontium gallium-magnesia oxide. This electrolyte green sheet is attached to a pre-sintered porous anode or cathode support, aged for drying and stabilization, and then finally co-sintered at 900 to 1,700° C. for several hours, thereby preparing an anode/electrolyte coated sintered body constituting a support type solid oxide fuel cell or solid oxide electrolysis cell and manufacturing a separation membrane for separating oxygen, hydrogen, nitrogen and other gases.

In the present invention, in the case of a cathode, a cathode material, which is a perovskite structure compound ($ABO_3$) whose A site is occupied with at least one selected from among La, Sr, Ca, Ba and Sm and whose B site is occupied with all or part of Mn, Co, Fe, Cr, Ni and Ti and at least one doped oxide selected from among zirconia, ceria, bismuth oxide, a barium-strontium cerate compound and a lanthanum-strontium gallium-magnesia oxide; and a pore forming agent such as graphite powder are mixed, molded and then primarily heat-treated at 600 to 1,500° C. for several hours, thereby forming a pre-sintered porous cathode support. This pre-sintered porous cathode support can be used as a cathode support for solid oxide fuel cells or solid oxide electrolysis cells.

In the present invention, at least one iron oxide including nickel oxide is mixed with yttria-stabilized zirconia or at least one of the above-mentioned electrolyte powders, added with an organic binder, a solvent and a pore forming agent, molded in the form of a flat board, a tube or a hybrid thereof, and then heat-treated at a high temperature of 1000° C., thereby preparing a pre-sintered anode support.

In the present invention, at least one selected from among zirconia oxide, alumina oxide, mullite oxide, silica oxide, carbide and nitride is mixed with an organic binder, a solvent (organic solvent or water-based solvent) and a pore forming agent, molded in the form of a flat board, a tube or a hybrid thereof, and then heat-treated at a high temperature of 700° C., thereby preparing a pre-sintered cathode support.

In the present invention, a slurry including at least one of ceramic solid oxide electrolytes, an organic binder and a solvent (organic solvent or water-based solvent) is tape-cast to form an electrolyte sheet, and then this electrolyte sheet is attached to a pre-sintered porous support, aged for drying or stabilization, and then finally co-sintered at 900° C. to 1700° C., thereby manufacturing a support type separation membrane necessary for separating oxygen, hydrogen, nitrogen and other gases.

In the present invention, in order to obtain a multi-stage composite coating layer, a ceramic slurry having a desired composition is tape-cast to form an electrolyte green sheet, and then this electrolyte green sheet is attached to a pre-sintered porous support, aged for drying or stabilization, and then finally co-sintered at 900° C. to 1700° C., thereby manufacturing a separation membrane used for composite solid oxide fuel cells, electrochemical devices, sensors and gas separators.

Hereinafter, the present invention will be described in more detail with reference to the attached drawings.

In the present invention, in order to prepare an electrolyte green sheet, first, a binder, a solvent and solid oxide powder are mixed to prepare paste or slurry. Here, ytrria-stabilized zirconia powder (8 mol % $Y_2O_3$—$ZrO_2$) may be used as the solid oxide powder. This slurry is tape-cast on a release film, for example, a PET film (Mylar film) coated with silica or the like, to form an electrolyte green sheet having desired thickness. Meanwhile, in order to reduce the difference in contraction between the electrolyte green sheet and the support attached with the green sheet, the support may be heat-treated (pre-sintered) to previously prepare a porous anode or cathode sintered body having air permeability.

When a desired electrolyte laminate (electrolyte green sheet+release film (Mylar film)) is attached to the surface of the fixed support while depressurizing one side of the laminate, only the electrolyte green sheet of the laminate is attached to the support due to the pressure difference between both ends of the support, and the Mylar film formed on the electrolyte green sheet is easily separated, and thus the Mylar film can be removed while leaving the electrolyte green sheet. In this way, an electrolyte membrane or connecting membrane can be formed on the surface of the support.

Figure 1:
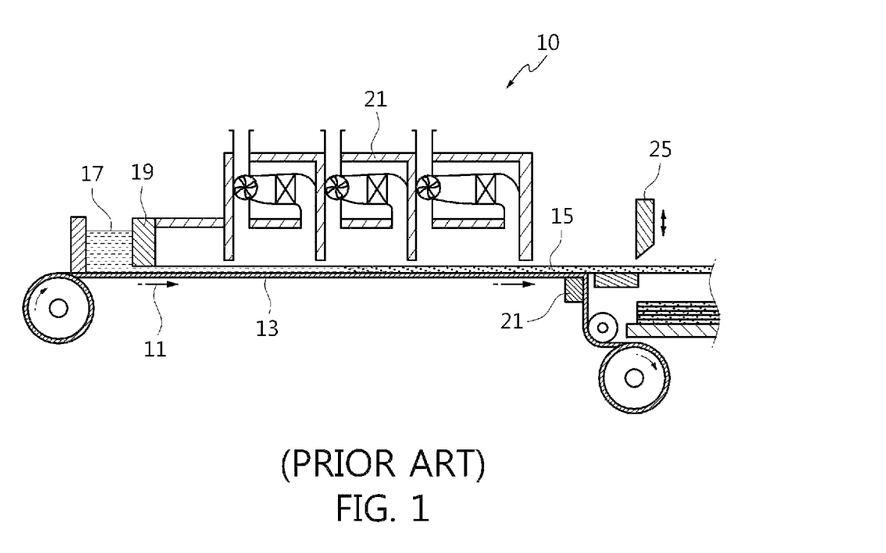
FIG. 1 is a schematic view showing a typical tape casting apparatus.

In the present invention, in order to adjust contraction, first, a support is pre-sintered to prepare a porous support having air permeability, and then an electrolyte green sheet 15 is fabricated using the tape casting apparatus 10 of FIG. 1. Specifically, a detachable PET film, called Mylar film (release film), coated with silicon and having a thickness of several tens or hundreds of micrometers (μm), is coated with an electrolyte slurry using the tape casting apparatus 10 of FIG. 1, and then dried by a drying oven to fabricate an electrolyte laminate (electrolyte green sheet+Mylar film).

Here, the reference numeral "13" is a conveyor sheet for conveying the electrolyte laminate, and the reference numeral "25" is a cutter for cutting the dried electrolyte laminate in a predetermined size.

Figure 2:
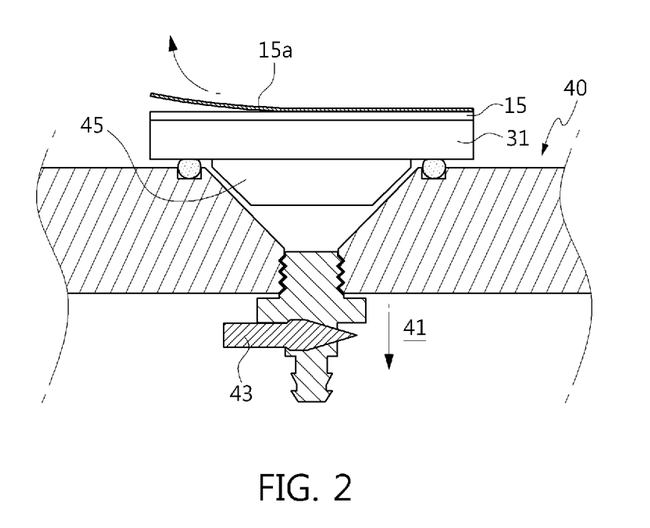
FIG. 2 is a schematic view showing a method of attaching a ceramic green sheet to a support using a pressurization/depressurization type attaching apparatus according to the present invention (Here, the arrow indicates a direction in which a release film is removed).

Meanwhile, the pre-sintered support 31 is fixed, and then one side of the support 31 is attached with an electrolyte laminate (electrolyte green sheet 15+Mylar film 15a) using the depressurization type attaching apparatus of FIG. 2 to allow the support 31 to be brought into contact with the laminate. In this case, in order to improve the contact uniformity between the support 31 and the laminate, it is preferred that a small amount of oil or solvent (for example, terpineol) be applied on the support 31 and then attached with the laminate. Thereafter, when one side of the support 31 is depressurized to −0.001 to −1 atm using a vacuum pump or the other side thereof is pressurized to 0.001 to 100 atms using compressed air (gas), the electrolyte green sheet 15 and Mylar film 15a constituting the electrolyte laminate can be easily separated by the pressure difference between both sides of the support 31, and thus the Mylar film 15a can be removed from the green sheet 15 attached to the support 31. As such, if the pressure difference between both sides of the support 31, caused by pressurization or depressurization, is maintained for a while, the support 31 and the electrolyte green sheet 15 can be completely attached to each other.

Figure 3:
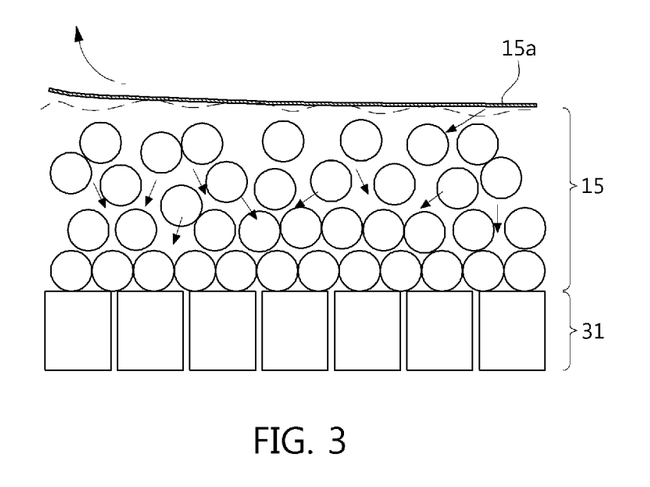
FIG. 3 is a schematic view showing a support-type coating film manufactured by the method according to the present invention (Here, the arrow indicates a direction in which a release film is removed).

Thereafter, when the laminate of the support 31 and the electrolyte green sheet 15 is dried by an oven or the like, the electrolyte green sheet 15 made by tape casting can be directly applied on the support 31, so electrolyte powder particles are uniformly arranged, which is one of the intrinsic characteristics of the tape-cast green sheet 15, thereby manufacturing a coated dense-structure having high green density. FIG. 3 shows the rearrangement of such electrolyte powder particles.

Compared to conventional wet or dry processes, the process of the present invention is effective in increasing the uniformity and green density. Further the process of the present invention is effective in maintaining the density of particles in the entire coating layer and decreasing the difference in contraction between both sides of the laminate at the time of drying or aging the laminate. Consequently, the thickness of the electrolyte coating layer can be adjusted by adjusting the concentration of slurry 17 and the height of a doctor blade 19 at the time of tape casting or by changing the number of times of attachment of the electrolyte green sheet 15. Further, when this laminate of the electrolyte green sheet 15 and the support 31 is finally heat-treated (sintered), a dense-structure electrolyte coating layer (membrane) can be obtained.

MODE FOR INVENTION

Hereinafter, the present invention will be described in more tail with reference to the following Examples. However, these Examples are set forth to illustrate the present invention, and the scope of the present invention is not limited thereto.

[Example 1] Preparation of a Sheet for Tape Casting and Manufacture of a Dense-Structure Coating Membrane Using a Depressurization Type Attaching Process A support type coating membrane was manufactured by the steps shown in FIG. 7. In the first step, support (anode or cathode) powder including a binder and a solvent was molded and heat-treated to form a pre-sintered support 31. Subsequently, in the second step, a ceramic (electrolyte) slurry 17 including an organic binder was tape-cast on a Mylar film 15a to form a ceramic (electrolyte) green sheet 15. Subsequently, in the third step, the ceramic green sheet 15 was spread with an organic solvent, and was then attached to one side of the pre-sintered support 31. Subsequently, in the fourth step, the pre-sintered support 31 attached with the ceramic green sheet 15 was placed on a stay 45 of a depressurization type attaching apparatus shown in FIG. 2, and then the Mylar film 15a was removed using a depressurization unit 41. Specifically, a valve 43 was opened under reduced pressure using a vacuum pump or other pressure reducing apparatuses (for example, aspirator), and then a check valve was controlled to maintain a desired pressure of −0.01 to −1 atm (measured by a pressure meter). Thereafter, the Mylar film 15a was slowly stripped from the ceramic green sheet, thus strongly fixing only the ceramic green sheet 15 on the upper surface of the pre-sintered support 31 while easily separating the Mylar film 15a from the ceramic green sheet 15. Subsequently, in the fifth step, a laminate of the pre-sintered support 31 and the ceramic green sheet 15 was aged in an electric oven or the like from room temperature to 400° C. to uniformalize the laminate. Finally, in the sixth step, the laminate was sintered at 1450° C. for 1 hour, thereby manufacturing a support-functional membrane (electrolyte membrane or separation membrane) coated sintered body.

[Example 2] Preparation of a Sheet for Tape Casting and Manufacture of a Dense-Structure Coating Membrane Using a Pressurization Type Attaching Process Similarly to Example 1, a support type coating membrane was manufactured by the steps shown in FIG. 7. Exceptionally, in the fourth step, a support 31 attached with a green sheet 15 was placed in a pressure container of a pressurization type attaching apparatus shown in FIG. 2 such that a Mylar film 15a was removed using a pressurization unit. Particularly, in the pressurization unit, a pressure of 0.01 to 100 atms (measured by a pressure meter) is applied using a regulator, and compressed air, nitrogen gas or high pressure gas equal thereto was used as gas for pressurization. For this purpose, pressurization was conducted in the pressure container, and depressurization was conducted by a valve 43 provided under the apparatus. Like this, the Mylar film 15a and the green sheet 15 were slowly separated from each other while the adhesive force of the green sheet 15 was well transferred to the support 31, and thus the Mylar film 15a was perfectly removed without damaging the green sheet 15. Other steps are the same as those of Example 1.

[Example 3] Preparation of a Sheet for Tape Casting and Manufacture of a Dense-Structure Coating Membrane Using a Combination of a Pressurization Type Attaching Process and a Depressurization Type Attaching Process A depressurization unit 41 provided under an apparatus 40 shown in FIG. 2 and a pressurization unit (not shown) provided over the apparatus 40 were simultaneously used. First, a valve 43 was opened using a vacuum pump or other pressure reducing apparatuses, and simultaneously a Mylar film 15a was slowly stripped from a green sheet while applying a pressure of 0.01 to 100 atms to the surface of a green sheet 15, thereby strongly fixing only the green sheet 15 on the upper surface of a support 31 while easily separating the Mylar film 15a from the green sheet 15. Similarly, pressurization was conducted in a pressure container, and depressurization was conducted by a valve 43 provided under the apparatus. Like this, the Mylar film 15a and the green sheet 15 were slowly separated from each other while the adhesive force of the green sheet 15 was well transferred to the support 31, and thus the Mylar film 15a was perfectly removed without damaging the green sheet 15. Other steps are the same as those of Examples 1 and 2.

[Example 4] Manufacture of a Dense-Structure Coating Membrane by Applying a Very Small Amount of Oil or Solvent onto the Surface of a Support and a Sheet after Preparing a Sheet for Tape Casting Similarly to Example 1, a support type coating membrane was manufactured by the steps shown in FIG. 7.

In the first step, support (anode or cathode) powder including a binder and a solvent was molded and heat-treated to form a pre-sintered support 31. Subsequently, in the second step, a ceramic (electrolyte) slurry 17 including an organic binder was tape-cast on a Mylar film 15a to form a ceramic (electrolyte) green sheet 15. Subsequently, in the third step, the ceramic green sheet 15 was spread with an organic solvent or oil, and was then attached to one side of the pre-sintered support 31. In this case, when the support is thick, the oil or solvent applied on the green sheet permeates into the porous support 31, and simultaneously the effect of depressurization is somewhat exhibited by a capillary phenomenon, and thus a Mylar film, that is, a release film can be easily attached, detached or removed. Further, even when the green sheet is insufficiently dried, it can be immediately attached by the remaining solvent or oil.

Therefore, the green sheet was attached to the support by adjusting the amount of a solvent or oil and the thickness of the support, the release film was stripped from the surface of the green sheet, and then the green sheet was easily attached to the support without being deformed. Thus, the fourth step of removing a Mylar film (release film) using depressurization or pressurization in Example could be omitted. Subsequently, in the following step (fourth) step, a laminate of the support 31 and the green sheet 15 was aged in an electric oven or the like from room temperature to 400° C. to uniformalize the laminate. Finally, in the fifth step, the laminate was sintered at 1450° C. for 1 hour, thereby manufacturing a support-functional membrane (electrolyte membrane or separation membrane) coated sintered body.

Other steps are the same as those of Examples 1 and 2.

[Application Example 1] Manufacture of a Flat Type Solid Oxide Electrolysis Cell (SOEC) or a Solid Oxide Fuel Cell (SOFC or DCFC)

NiO powder and $ZrO_2+8Y_2O_3$ (TZ-8YS, YSZ) were mixed at a weight ratio of 50:50, 24 vol % of spherical graphite, as a pore forming agent, and 0.5 wt % of PVA, as a binder, were added thereto and wet-mixed therewith, and then this mixed powder was dried and pulverized. This resulting powder was molded to obtain a plate specimen having a thickness of 1 to 2 mm and an area of 13 cmm×13 cm. This plate specimen is pre-sintered at 1400° C. to fabricate an anode support substrate) having a porosity of 40%. Further, in order to fabricate an electrolyte green sheet, about 15 g of yttria-stabilized zirconia (YSZ) powder having a particle size of 0.5 μm was mixed with 50 cc of ethyl alcohol, as a solvent, and stirred. Then, this solution was added with 1.5 cc of fish oil as a dispersant, 20 g of polyvinyl butyral (PVB) as a binder, 4 g of dioctyl phthalate (DOP) as a plasticizer and 3 g of DPB as a defoamer, and then stirred for 4 hours or more using a ball mill to prepare stable slurry.

The prepared slurry, as shown in FIG. 1, was formed into a green sheet 15 having a thickness of 5 micrometers (μm) to several hundreds of micrometers (μm) using a tape casting apparatus or a doctor blade apparatus, and, at the time of tape casting, a green sheet 15 was fabricated using a Mylar film 15a (thickness: 30 to 90 μm) whose one side is coated with silica. The fabricated sheet 15 was painted with a very small amount of terpineol by a brush, and then attached to the upper side of a support 31 to cover the support 31. The support 31 added with the green sheet 15 was placed in an apparatus shown in FIG. 2, and, as mentioned in Examples 1 to 3, the Mylar film 15a from the green sheet 15, and then the coating layer of the green sheet 15 was stabilized on the surface of the support 31. The coating layer and the support were put into an oven at 50° C. to remove a solvent therefrom, and were then heated to 1450° C. or higher at a heating rate of 3° C./min to be sintered. According to the present invention, this coating layer was sufficiently attached to the porous support 31 without being cracked even when it was sintered together with the porous support 31 during or after drying, thereby forming a perfect sintered body. In particular, the thickness of the coating layer could be freely adjusted in a range of 0.1 μm to several hundreds of micrometers (μm).

Figure 6:
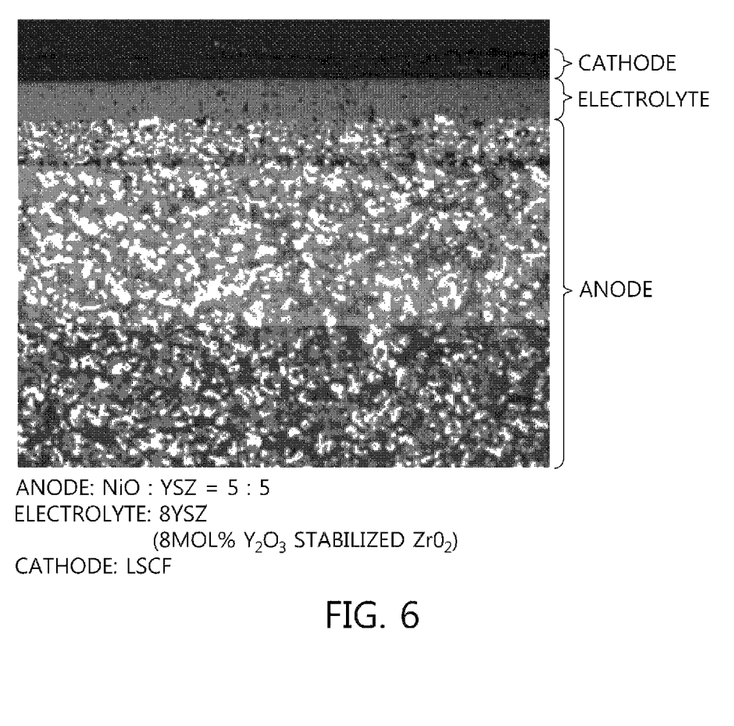
FIG. 6 is a photograph showing the section of a unit cell in a solid oxide fuel cell manufactured by the method of the present invention (Here, the anode includes a support and a functional layer formed on the support).

A fuel cell or an electrolysis cell for high-temperature electrolysis was manufactured using such a dense-structure coating film. For this purpose, first, a cathode paste was prepared using only a perovskite structure compound ($ABO_3$) such as LSM ($La_{0.8}Sr_{0.2}MnO_3$) or LSCF (($La_{0.6}Sr_{0.4})(Co_{0.2}Fe_{0.8})O_3$), as a cathode material, whose A site is occupied with at least one selected from among La, Sr, Ca, Ba and Sm and whose B site is occupied with all or part of Mn, Co, Fe, Cr, Ni and Ti or by mixing the cathode material with at least one doped oxide selected from among zirconia, ceria, bismuth oxide, a barium-strontium cerate compound and a lanthanum-strontium gallium-magnesia oxide at a weight ratio of 1:1 and then adding a binder, a pore forming agent and an organic solvent thereto. Then, the prepared cathode paste was silk-printed (screen-printed) on the upper surface of an electrolyte, and then heat-treated at about 1100° C. for 1 hour to manufacture a support (cathode/anode) structured solid oxide fuel cell or single cell. FIG. 6 is a photograph showing the section of the solid oxide fuel cell or single cell manufactured in this way, wherein an electrolyte layer having a thickness of about 30 μm is well attached to the support (anode) and cathode.

If necessary, in order to improve the performance of an anode and the sintering characteristics of an electrolyte, a functional anode is previously attached to a support using screen printing or tape casting and heat-treated, and then coated with a ceramic electrolyte layer and heat-treated to manufacture an electrolysis cell or single fuel cell, thereby improving the above sintering characteristics and electrical characteristics.

[Application Example 2] Manufacture of a Flat Type Electrolysis Cell and a Fuel Cell Interconnection Membrane Similarly, NiO powder and $ZrO_2+8Y_2O_3$ (TZ-8YS, YSZ) were mixed at a weight ratio of 50:50, 24 vol % of spherical graphite, as a pore forming agent, and 0.5 wt % of PVA, as a binder, were added thereto and wet-mixed therewith, and then this mixed powder was dried and pulverized. This resulting powder was molded to obtain a plate specimen having a thickness of 1 to 2 mm and an area of 13 cmm×13 cm. This plate specimen was pre-sintered at 1400° C. to fabricate an anode support (substrate) having a porosity of 40%. Meanwhile, in order to fabricate a conductive ceramic interconnection membrane, a green sheet thereof was prepared. Specifically, about 15 g of lanthanum chromite compound ($LaSrCrO_3$, LSCr) based perovskite powder having a particle size of 0.5 μm was mixed with 50 cc of ethyl alcohol, as a solvent, and stirred. Then, this solution was added with 1.5 cc of fish oil as a dispersant, 20 g of polyvinyl butyral (PVB) as a binder, 4 g of dioctyl phthalate (DOP) as a plasticizer and 3 g of DPB as a defoamer, and then stirred for 4 hours or more using a ball mill to prepare stable slurry. The prepared slurry, as shown in FIG. 1, was formed into a green sheet 15 having a thickness of 5 micrometers (μm) to several hundreds of micrometers (μm) using a tape casting apparatus or a doctor blade apparatus, and, at the time of tape casting, a green sheet 15 was fabricated using a Mylar film 15a (thickness: 30 to 90 μm) whose one side is coated with silica. The fabricated sheet 15 was painted with a very small amount of terpineol by a brush, and then attached to the upper side of a support 31 to cover the support 31. The support 31 added with the green sheet 15 was placed in an apparatus shown in FIG. 2, and, as mentioned in Examples 1 to 3, the Mylar film 15a from the green sheet 15, and then the coating layer of the green sheet 15 was stabilized on the surface of the support 31. The coating layer and the support were put into an oven at 50° C. to remove a solvent therefrom, and were then heated to 1450° C. or higher at a heating rate of 3° C./min to be sintered. According to the present invention, this coating layer was sufficiently attached to the porous support 31 without being cracked even when it was sintered together with the porous support 31 during or after drying, thereby forming a perfect sintered body. In particular, the thickness of the coating layer could be freely adjusted in a range of 0.1 μm to several hundreds of micrometers (μm). Other steps are the same as in Application Example 1.

[Application Example 3] Manufacture of a Tubular Solid Oxide Electrolysis Cell (SOEC) or a Solid Oxide Fuel Cell (SOFC or DCFC)

Similarly, NiO powder and $ZrO_2+8Y_2O_3$ (TZ-8YS, YSZ) were mixed at a weight ratio of 50:50, and then suitable amounts of carbon powder and a binder (starting materials) were added thereto and then wet-mixed to fabricate a tubular pre-sintered anode support having a porosity of about 40%. The fabricated tubular pre-sintered anode support was attached with a green sheet using an apparatus shown in FIG. 2. Particularly, one end of the tubular anode support was mounted with fittings by reconstructing the apparatus of FIG. 2, thus making pressure transfer easy, and the tubular anode support was entirely wound with a green sheet, as mentioned in Examples 1 to 3 and Application Example 1 and 2, thus making pressure transfer easy, and then a Mylar film was removed from the green sheet, and the green sheet was uniformalized. In this case, the green sheet was prepared using YSZ ceramic powder and the tape casting apparatus, as mentioned in Application Example 1. The tubular anode support fabricated in this way was dried and sintered at 1450° C. or higher, thereby obtaining a perfect sintered body including the support and coating layer attached to each other. Similarly, a cathode paste was prepared using only a perovskite structure compound ($ABO_3$) such as LSM ($La_{0.8}Sr_{0.2}MnO_3$) or LSCF (($La_{0.6}Sr_{0.4}$)($Co_{0.2}Fe_{0.8}$)$O_3$), as a cathode material, whose A site is occupied with at least one selected from among La, Sr, Ca, Ba and Sm and whose B site is occupied with all or part of Mn, Co, Fe, Cr, Ni and Ti or by mixing the cathode material with at least one doped oxide selected from among zirconia, ceria, bismuth oxide, a barium-strontium cerate compound and a lanthanum-strontium gallium-magnesia oxide at a weight ratio of 1:1 and then adding a binder, a pore forming agent and an organic solvent thereto. Then, the prepared cathode paste was silk-printed (screen-printed) on the upper surface of an electrolyte, and then heat-treated at about 1100° C. for 1 hour to manufacture a support (cathode/anode) structured solid oxide fuel cell or single cell. Other steps are the same as in Application Example 1.

[Application Example 4] Manufacture of a Tubular Electrolysis Cell and a Fuel Cell Interconnection Membrane Similarly, NiO powder and $ZrO_2+8Y_2O_3$ (TZ-8YS, YSZ) were mixed at a weight ratio of 50:50, and then suitable amounts of carbon powder and a binder (starting materials) were added thereto and then wet-mixed to fabricate a tubular pre-sintered anode support having a porosity of about 40%. The fabricated tubular pre-sintered anode support was attached with a green sheet using an apparatus shown in FIG. 2. Particularly, one end of the tubular anode support was mounted with fittings by reconstructing the apparatus of FIG. 2, thus making pressure transfer easy, and the tubular anode support was entirely wound with a green sheet, as mentioned in Examples 1 to 3 and Application Example 1 and 2, thus making pressure transfer easy, and then a Mylar film was removed from the green sheet, and the green sheet was uniformalized. In this case, the green sheet was prepared using lanthanum chromite compound ($LaSrCrO_3$, LSCr) based perovskite powder and the tape casting apparatus, as mentioned in Application Example 2. The tubular anode support fabricated in this way was dried and sintered at 1450° C. or higher, thereby obtaining a perfect sintered body including the support and coating layer attached to each other. Other steps are the same as in Application Example 2.

[Application Example 5] Manufacture of a Composite Electrolyte Membrane and Other Support Type Dense-Structure Membranes (Separation Membranes)

Figure 4:
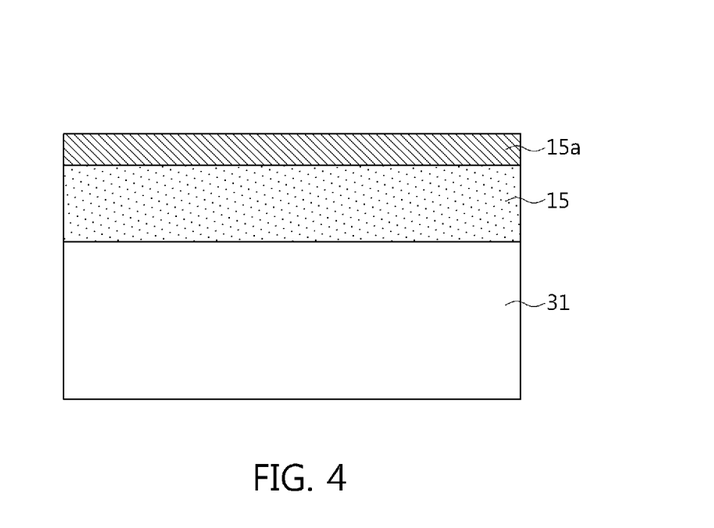
FIG. 4 is a sectional view of a single cell in a high-temperature electrolysis cell or solid oxide fuel cell manufactured by the method of the present invention.
Figure 5:
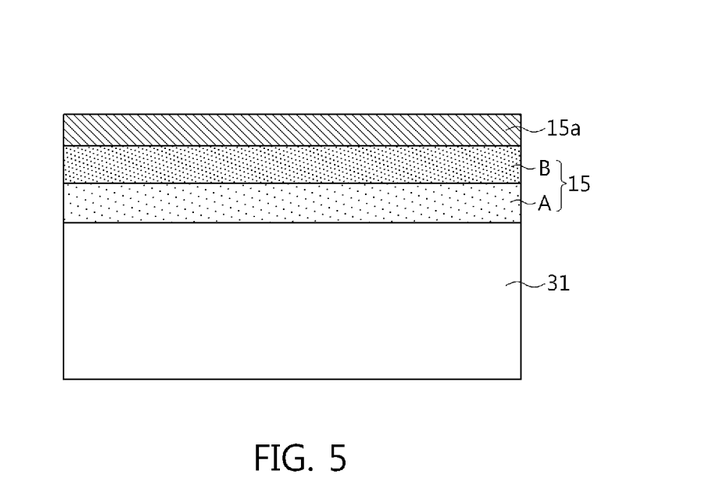
FIG. 5 is a sectional view of a single cell in a high-temperature multi-layered electrolysis cell or solid oxide fuel cell manufactured by the method of the present invention.

Generally, among electrolytes for a fuel cell, as electrolytes having oxygen ion conductivity, there are yttria or calcia, zirconia ($ZrO_2$) compounds doped with magnesia, ceria ($CeO_2$) compounds doped with gadolinium (Gd) or samarium (Sm), bismuth oxide ($Bi_2O_3$) compounds, lanthanum (La)-based perovskite compounds (for example, (LaSr)(GaMg)$O_3$)), and the like. Further, as electrolytes having hydrogen conductivity, there are barium-strontium ceria compounds ((Ba,Sr)$CeO_3$), and the like. The electrolyte for a fuel cell may include a plurality of components depending on the use (oxygen separation membrane and hydrogen separation membrane) and characteristics thereof. Generally, as shown in FIG. 4, an electrolyte may be formed into a single electrolyte layer, but, as shown in FIG. 5, may also be formed into a multiple electrolyte layer.

For this purpose, a pre-sintered support (substrate) 31 having a porosity of about 40% was fabricated, and then a ceramic green sheet 15 having a desired composition using the tape casting apparatus of FIG. 1. Then, the green sheet 15 was attached to the support 31 using the apparatus of FIG. 2, and simultaneously a Mylar film 15a was removed from the green sheet 15, thereby fabricating a coating layer.

In order to prepare a slurry 17 used for a first coating layer (electrolyte layer) (A), solid yttria-stabilized zirconia powder (YSZ) having a particle size of about 1 μm or less was selected, and was prepared as in Application Example 1. In order to fabricate a second coating layer (B), ceria or bismuth oxide was mixed with a dispersant and a binder to prepare a slurry, and then the slurry was formed into a green sheet. Thereafter, as in Examples 1, 2 and 3, the green sheet was attached to the support using a slurry coating apparatus. Meanwhile, first, a first coating layer (A) was formed using a zirconia sheet and heat-treated at 1400° C. or higher, and then a second coating layer (B) was formed using a bismuth oxide sheet and heat-treated at about 950° C. for 1 hour, thereby manufacturing a support type composite electrolyte membrane. Such a support type composite electrolyte membrane can be used for high-efficiency and high-performance fuel cells such as solid oxide fuel cell (SOFC), direct carbon fuel cells (DCFC) and the like. Further, when a pore size-adjustable membrane is fabricated using an alumina or mullite ceramic support, this membrane can be used in manufacturing a separation membrane capable of separating various kinds of gases or such as oxygen, hydrogen, nitrogen and the like or various kinds of fluids.

The support type coating membrane manufactured by the above-mentioned method is included in a fuel cell or electrolysis cell.

Generally, an electrochemical device, such as an electrolysis cell or fuel cell, is configured such that one or more porous layers or supports are provided therebetween with an electrolyte membrane or separation membrane. Such an electrolyte membrane or separation membrane is obtained through coating and heat treatment (sintering). Actually, in order to decrease the difference in contraction between a coating layer and a support, a support is heat-treated (pre-sintered) to prepare a porous sintered body having air permeability, and this porous sintered body is tape-cast with a solid oxide electrolyte or a solid oxide ceramic film to form a green sheet, and then this green sheet is attached to a support and heat-treated, thereby manufacturing a support type functional membrane or separation membrane having relatively thin coating layer.

The method of manufacturing a support type coating membrane according to the present invention can be used in manufacturing high-performance solid oxide electrolysis cells (SOECs) capable of operating at low temperature, solid oxide fuel cells (SOFCs), direct carbon fuel cells (DCFCs) having a multi-functional membrane, ion transport membranes (ITMs) used in separating oxygen or hydrogen in integrated gasification combined cycle (IGCC).

What is claimed is:

1. A method of manufacturing a support type coating membrane, comprising the steps of:
    forming a pre heat-treated support;
    forming a green sheet on a release film for a coating membrane;
    attaching the green sheet onto the pre heat-treated support directly to form a laminate including the release film, green sheet and support;
    removing the release film from the laminate to form a combination of the support and green sheet; and
    co-sintering the combination,
    wherein the pre heat-treated support is an anode or cathode,
    wherein the coating membrane is an electrolyte layer or separation membrane, and
    wherein, in the step of forming the green sheet, the green sheet is formed by tape-casting a binder-containing ceramic slurry on the release film,
    wherein, in the step of forming the support, the support is formed by molding and heat-treating binder-containing powder for support, and is a pre-sintered porous support having a porosity of 5 to 70%,
    wherein, in the step of forming the combination of the support and green sheet by removing the release film, the green sheet is attached onto the support using a pressurization-type or depressurization-type attaching apparatus, and then the release film is removed therefrom,
    wherein the green sheet is attached to the support by generating a pressure difference between both sides of the support using the pressurization-type or depressurization-type attaching apparatus, and
    wherein the release film is separated by generating the pressure difference between both sides of the support using the pressurization-type or depressurization-type attaching apparatus.

2. The method of claim 1, further comprising a step of applying a solvent or oil onto the support or green sheet before the step of forming the laminate, wherein the support is directly attached to the green sheet, and then the release film is removed therefrom.

3. The method of claim 1, further comprising a step of aging the combination of the support and green sheet, after the step of forming the combination thereof by removing the release film.

4. The method of claim 1, wherein the coating membrane has a thickness of 0.1 to 900 μm.

5. The method of claim 1, wherein the thickness and composition of the coating membrane is adjusted at the time of forming the green sheet, or is adjusted at the time of forming a multi-layered dense-structure film by repeatedly attaching different green sheets to each other.

6. The method of claim 1, wherein the support is formed into a pre-sintered porous anode support by a process comprising the steps of: mixing an anode material containing NiO powder with at least one doped oxide selected from among zirconia, ceria, bismuth oxide, a barium-strontium cerate compound and a lanthanum-strontium gallium-magnesia oxide at a weight ratio of 10:90 to 90:10; adding a pore forming agent to the mixture; ball-milling, drying and molding the mixture; and heat-treating the mixture at 600 to 1,500° C.

7. The method of claim 1, wherein the support is formed into a pre-sintered porous anode support by a process comprising the steps of: mixing a perovskite structure compound ($ABO_3$), as a cathode material, whose A site is occupied with at least one selected from among La, Sr, Ca, Ba and Sm and whose B site is occupied with all or part of Mn, Co, Fe, Cr, Ni and Ti with at least one doped oxide selected from among zirconia, ceria, bismuth oxide, a barium-strontium cerate compound and a lanthanum-strontium gallium-magnesia oxide; adding a pore forming agent to the mixture; ball-milling, drying and molding the mixture; and heat-treating the mixture at 600 to 1,500° C.

8. The method of claim 1, wherein the electrolyte layer is formed into an electrolyte green sheet by tape-casting a slurry including an organic binder, a solvent and at least one doped oxide-type electrolyte material selected from among zirconia, ceria, bismuth oxide, a barium-strontium cerate compound and a lanthanum-strontium gallium-magnesia oxide.

9. The method of claim 1, wherein the support is a flat support, a tubular support or a hybrid support thereof.

10. The method of claim 9, wherein the support is formed into a pre-sintered anode support by a process comprising the steps of: mixing an iron oxide including nickel oxide with electrolyte powder including yttria-stabilized zirconia at a weight ratio of 10:90 to 90:10; adding an organic binder, a solvent and a pore forming agent to the mixture; molding the mixture into a flat body, tubular body or hybrid thereof; and heat-treating the molded body at 1,000° C. or higher.

11. The method of claim 9, wherein the support is formed into a pre-sintered cathode support by a process comprising the steps of: mixing an organic binder, a solvent and a pore forming agent with at least one selected from among zirconia oxide, alumina oxide, mullite oxide, silica oxide, carbide and nitride; molding the mixture into a flat body, tubular body or hybrid thereof; and heat-treating the molded body at 700° C. or higher.

12. The method of claim 1, wherein the coating membrane has a sintered density of 30% or more.

13. A support type coating membrane, manufactured by the method of claim 1.

14. A fuel cell, comprising the support type coating membrane of claim 13.

15. An electrolysis cell, comprising the support type coating membrane of claim 13.

* * * * *